(12) United States Patent
Coffman

(10) Patent No.: US 11,544,839 B2
(45) Date of Patent: Jan. 3, 2023

(54) SYSTEM, APPARATUS AND METHOD FOR FACILITATING INSPECTION OF A TARGET OBJECT

(71) Applicant: The Boeing Company, Chicago, IL (US)

(72) Inventor: Mathew Albert Coffman, Berkeley, MO (US)

(73) Assignee: THE BOEING COMPANY, Chicago, IL (US)

( * ) Notice: Subject to any disclaimer, the term of this patent is extended or adjusted under 35 U.S.C. 154(b) by 107 days.

(21) Appl. No.: 16/431,304

(22) Filed: Jun. 4, 2019

(65) Prior Publication Data

US 2020/0388017 A1 Dec. 10, 2020

(51) Int. Cl.
*G06T 7/00* (2017.01)
*G01N 21/84* (2006.01)
*G06T 7/60* (2017.01)

(52) U.S. Cl.
CPC ............ *G06T 7/001* (2013.01); *G01N 21/84* (2013.01); *G06T 7/60* (2013.01); *G06T 2207/10004* (2013.01); *G06T 2207/20101* (2013.01)

(58) Field of Classification Search
CPC . G06T 7/001; G06T 7/60; G06T 2207/10004; G06T 2207/20101; G01N 21/84
USPC .......................................................... 382/103
See application file for complete search history.

(56) References Cited

U.S. PATENT DOCUMENTS

| | | | | | |
|---|---|---|---|---|---|
| 4,549,210 | A | * | 10/1985 | Dulapa | G01N 29/0645 348/163 |
| 2009/0169072 | A1 | * | 7/2009 | Lo | G06K 9/0008 382/125 |
| 2016/0289042 | A1 | * | 10/2016 | Fang | G05B 15/02 |
| 2018/0158246 | A1 | * | 6/2018 | Grau | G06T 3/0093 |

FOREIGN PATENT DOCUMENTS

WO  WO-2016050729 A1 * 4/2016 ......... G06K 9/00275

* cited by examiner

*Primary Examiner* — Wednel Cadeau
(74) *Attorney, Agent, or Firm* — Alston & Bird LLP (57) ABSTRACT

A system, apparatus and method are provided for facilitating inspection of a target object. In the context of a method, an image is received that includes the target object. The method applies a first mask to at least a portion of the image in order to mask one or more foreground objects that at least partially block view of the target object. The method further includes applying a second mask to at least a portion of the image in order to mask a background of the target object. The method additionally includes analyzing the image of the target object following application of the first and second masks in order to identify one or more regions of the target object that merit further inspection. A corresponding system and apparatus are also provided.

20 Claims, 6 Drawing Sheets

SYSTEM, APPARATUS AND METHOD FOR FACILITATING INSPECTION OF A TARGET OBJECT

TECHNOLOGICAL FIELD

An example embodiment relates generally to the inspection of a target object and, more particularly, to a system, apparatus and method for facilitating inspection of a target object by masking one or more foreground objects and/or a background of the target object in order to facilitate identification of one or more regions of the target object that merit further inspection.

BACKGROUND

Images are analyzed in a wide variety of applications in order to assess a target object that appears within the image. By way of example, an image that includes a target object may be analyzed in an effort to identify regions of the target object that merit further inspection, such as regions of the target object that potentially include anomalies. The analysis of an image of a target object in an effort to identify anomalies may occur in conjunction with various operations, such as during the production or repair of the target object or during the performance of other maintenance activities upon the target object.

However, images of a target object sometimes also include other objects or scenery that increases the difficulty associated with focusing upon and effectively analyzing the target object. For example, an image of a target object may include one or more foreground objects that at least partially block the view of the target object. In this regard, the foreground objects are located between the target object and the camera or other image capturing device that captures the image of the target object and, as a result, block the view of a portion of the target object. Additionally, the image of the target object may include a background behind the target object that may also distract from the focus upon and the effective analysis of the target object. As a result of the foreground object(s) and the background, the analysis of the target object may be hindered, thereby making it more difficult to accurately inspect the target object and to reliably identify any anomalies exhibited by the target object.

With respect to the inspection of a target object, automated inspection techniques have been developed. At least some of these automated inspection techniques rely upon machine learning in order to train the image processing algorithms utilized to analyze an image of a target object and to identify one or more potential anomalies exhibited by the target object. In this regard, training data is typically employed in order to train the machine learning inspection algorithm to identify the potential anomalies of a target object. The training data includes images of target objects, some without anomalies and some with anomalies that have been tagged or otherwise identified. However, the training data generally does not include foreground objects or a background that distract from the target object that is the subject of the training data. As such, automated inspection techniques that have been trained utilizing training data of this type may not perform as reliably as is desired. Instead, in instances in which the images of the target object that are analyzed also include one or more foreground objects and/or a background, these automated inspection techniques may generate an undesirably high level of false positives in which potential anomalies are identified in conjunction with the one or more foreground objects and/or the background, which are not the focus of the inspection efforts.

As a result, these automated inspection techniques may be not only computationally inefficient as additional computing resources are expended to analyze the foreground object(s) and/or the background and to identify anomalies associated therewith, but may also be relatively inefficient overall as a result of the additional time and effort expended to manually inspect each of the potential anomalies including those identified in conjunction with the one or more foreground objects and/or the background of the target object.

BRIEF SUMMARY

A system, apparatus and method are provided for facilitating inspection of a target object in accordance with an example embodiment of the present disclosure. The system, apparatus and method of an example embodiment reduce the potential deleterious impact of one or more foreground objects and/or the background of the target object, thereby permitting more focus to be placed upon the target object and allowing for increased accuracy and/or reliability with respect to the inspection results. Thus, the system, apparatus and method of an example embodiment permit a target object to be automatically inspected and to permit one or more regions of the target object to be identified that merit further inspection, such as one or more potential anomalies of the target object, in an efficient manner by reducing the number of false positives associated with the automated inspection of a target object in at least some instances.

In an example embodiment, a method is provided for facilitating inspection of a target object. The method includes receiving an image including the target object and applying a first mask to at least a portion of the image in order to mask one or more foreground objects that at least partially block view of the target object. The method also includes applying a second mask to at least a portion of the image in order to mask a background of the target object. The method further includes analyzing the image of the target object following application of the first and second masks in order to identify one or more regions of the target object that merit further inspection. In an example embodiment, the method additionally includes causing one or more markers to be displayed in order to indicate the one or more regions of the target object that have been identified to merit further inspection.

The method of an example embodiment also includes interpolating across one or more portions of the target object that are masked by the first mask in order to fill the one or more portions of the target object to which the view is at least partially blocked by the one or more foreground objects. In an example embodiment, the method applies the first mask by accessing one or more models of predetermined types of foreground objects, fitting the one or more models to one or more foreground objects in the image and defining the first mask based upon a respective model fit to a respective foreground object. Additionally or alternatively, the method of an example embodiment applies the first mask by scanning a scene including the target object that is the subject of the image to generate three-dimensional surfaces of the one or more foreground objects, fitting the three-dimensional surfaces to one or more foreground objects in the image and defining the first mask based upon a respective three-dimensional surface fit to a respective foreground object. The method of an example embodiment applies the second mask by accessing one or more models of candidate target objects, fitting the one or more models to the target object in the image and defining the second mask based upon a respective model fit to the target object. Additionally or alternatively, the method of an example embodiment applies the second mask by scanning a scene including the target object that is the subject of the image to generate a three-dimensional surface of the target object, fitting the three-dimensional surface to the target object in the image and defining the second mask based upon a respective three-dimensional surface fit to the target object.

In another embodiment, an apparatus is provided that is configured to facilitate inspection of a target object. The apparatus includes a computing device configured to receive an image including the target object and to apply a first mask to at least a portion of the image in order to mask one or more foreground objects that at least partially block view of the target object. The computing device is also configured to apply a second mask to at least a portion of the image in order to mask a background of the target object. The computing device is further configured to analyze the image of the target object following application of the first and second masks in order to identify one or more regions of the target object that merit further inspection. In an example embodiment, the computing device is further configured to cause one or more markers to be displayed in order to indicate the one or more regions of the target object that have been identified to merit further inspection.

The computing device of an example embodiment is further configured to interpolate across one or more portions of the target object that are masked by the first mask in order to fill the one or more portions of the target object to which the view is at least partially blocked by the one or more foreground objects. In an example embodiment, the computing device is configured to apply the first mask by accessing one or more models of predetermined types of foreground objects, fitting the one or more models to one or more foreground objects in the image and defining the first mask based upon a respective model fit to a respective foreground object. Additionally or alternatively, the computing device of an example embodiment is configured to apply the first mask by scanning a scene including the target object that is the subject of the image to generate three-dimensional surfaces of the one or more foreground objects, fitting the three-dimensional surfaces to one or more foreground objects in the image and defining the first mask based upon a respective three-dimensional surface fit to a respective foreground object. In an example embodiment, the computing device is configured to apply the second mask by accessing one or more models of candidate target objects, fitting the one or more models to the target object in the image and defining the second mask based upon a respective model fit to the target object. Additionally or alternatively, the computing device an example embodiment is configured to apply the second mask by scanning a scene including the target object that is the subject of the image to generate a three-dimensional surface of the target object, fitting the three-dimensional surface to the target object in the image and defining the second mask based upon a respective three-dimensional surface fit to the target object.

In a further example embodiment, a system is provided that is configured to facilitate inspection of a target object. The system includes a computing device configured to apply a first mask to at least a portion of an image of the target object in order to mask one or more foreground objects that at least partially block view of the target object. The computing device is also configured to apply a second mask to at least a portion of the image in order to mask a background of the target object. The computing device is further configured to analyze the image of the target object following application of the first and second masks in order to identify one or more regions of the target object that merit further inspection. The system further includes an augmented reality display configured to display an image of the target object and to also display information regarding the one or more regions of the target object that merit further inspection.

The augmented reality display of an example embodiment includes a head-worn augmented reality display device, such as augmented reality glasses. In an example embodiment, the information regarding the one or more regions comprises one or more markers displayed by the augmented reality display in order to indicate the one or more regions of the target object that have been identified to merit further inspection. The computing device of an example embodiment is further configured to interpolate across one or more portions of the target object that are masked by the first mask in order to fill the one or more portions of the target object to which the view is at least partially blocked by the one or more foreground objects. In an example embodiment, the computing device is further configured to apply the first mask by accessing one or more models of predefined types of foreground objects, fitting the one or more models to one or more foreground objects in the image and defining the first mask based upon a respective model fit to a respective foreground object.

BRIEF DESCRIPTION OF THE DRAWINGS

Having described certain example embodiments of the present disclosure in general terms above, reference will now be made to the accompanying drawings, which are not necessarily drawn to scale and wherein.

DETAILED DESCRIPTION

Some embodiments of the present disclosure will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure.

A variety of objects are inspected, such as during a manufacturing process, during performance of maintenance or repair operations or otherwise. Inspections are generally performed to identify anomalies associated with the object. If any anomalies are identified, those regions of the object that include the detected anomalies may be subjected to more detailed attention in order to address the anomaly, if so required. By way of example, during the manufacture of an aircraft, the body of the aircraft may be inspected and any anomalies, such as regions of the aircraft that have not been fully painted, may be identified and manufacturing personnel may revisit those regions in order to address the anomalies, such as by touching up the paint on the body of the aircraft in the regions in which an anomaly was identified.

Figure 1:
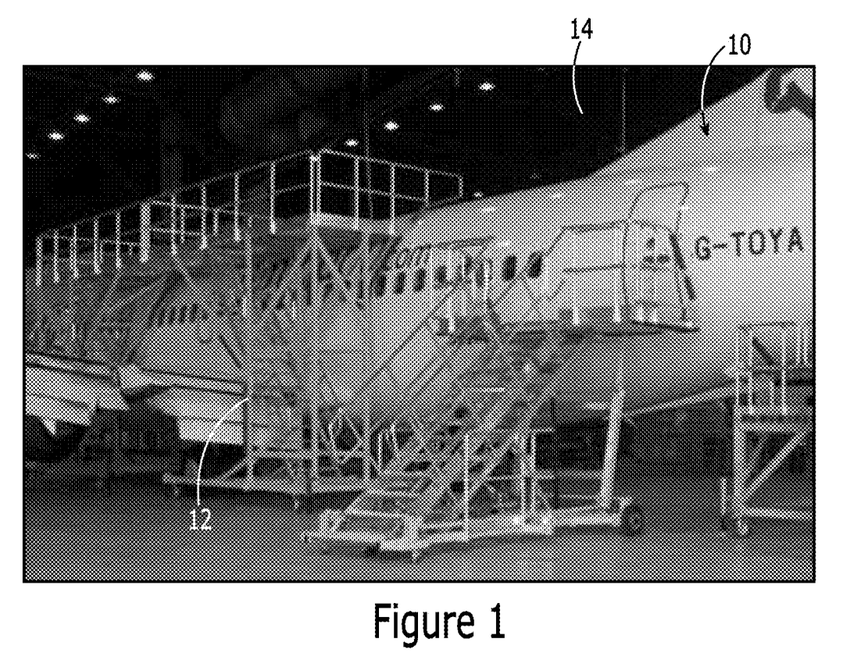
FIG. 1 is an image of a portion of a fuselage of an aircraft that includes a foreground object blocking a portion of the fuselage and a background behind the fuselage.

In an effort to perform inspections in a more efficient and more consistent manner, automated inspection techniques have been developed, such as for use in collaboration with manual inspection techniques or instead of manual inspection techniques. Automated inspection techniques oftentimes review an image of the object under inspection in order to identify anomalies, such as by comparing the image of the object to an image of the same type of object that is free of anomalies or that includes certain designated types of anomalies in order to identify the anomalies. In some instances, however, the object under inspection may be at least partially blocked by one or more foreground objects and/or the image including the object under inspection may be cluttered with a background that renders the inspection more difficult to perform in a reliable manner. For example, FIG. 1 depicts an image of the portion of the fuselage of an aircraft 10 that is to be inspected. However, the inspection of the portion of the fuselage captured by the image is made more difficult by scaffolding 12 that sits in front of the fuselage as well as the background 14 behind the fuselage, the combination of which makes it more challenging to identify anomalies associated with the portion of the fuselage within the image with the accuracy and consistency that is desired.

A system, apparatus and method are provided in accordance with an example embodiment in order to facilitate the inspection of a target object. While any of a wide variety of target objects may be inspected in accordance with an example embodiment, the system, apparatus and method will be described herein in conjunction with the inspection of the body of an aircraft 10 by way of example, but not of limitation. The system, apparatus and method of an example embodiment facilitate the inspection of the target object in such a manner that at least some of the foreground objects and at least some of the background are masked and therefore removed from the image under analysis in order to permit anomalies associated with the target object to be identified in a more efficient and accurate manner. Based upon the identification of the anomalies, those regions of the target object for which an anomaly has been identified may be further inspected, such as by manual inspection, in order to confirm the presence of the anomaly or to discount the identification of the anomaly with those anomalies that are confirmed subsequently being addressed, such as by the performance of various maintenance operations.

Figure 2:
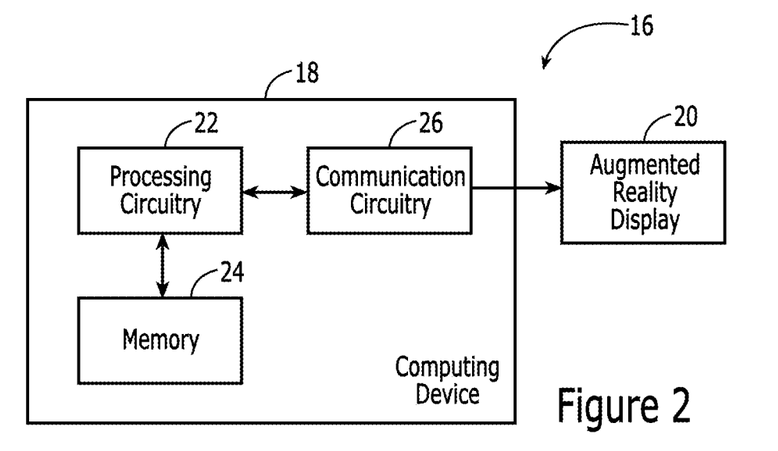
FIG. 2 is a block diagram of a system including a computing device and an augmented reality display in accordance with an example embodiment of the present disclosure.

The system 16 for facilitating inspection of a target object may be embodied by a computing device 18 in combination with an augmented reality display 20 as shown in FIG. 2. The augmented reality display 20 may be configured in various manners including, for example, by a head-worn display device, such as augmented reality glasses.

Any of a wide variety of computing devices 18 may be employed. Example embodiments may include a plurality of networked devices operating in a distributed system. In this regard, it will be understood that the term "distributed system" refers to a plurality of networked devices in which some components are shared among the devices. Whether or not the computing device 18 is implemented using a distributed system, the computing device of an example embodiment may be embodied by an image processor, a video processor, an augmented reality system, any of a variety of fixed terminals, such as servers, desktop computers, mainframe devices, kiosks, or the like, and or by any of a variety of mobile terminals, such as portable digital assistants (PDAs), mobile telephones, smartphones, laptop computers, tablet computers, or any combinations of the aforementioned devices.

As shown in FIG. 2, system 16 of an example embodiment includes processing circuitry 22, a memory 24, and optionally communications circuitry 26. The system 16, such as the processing circuitry 22, may be configured to execute the operations described below in connection with FIGS. 3, 6 and 7. In some embodiments, the processing circuitry 22 may be in communication with the memory 24 via a bus for passing information among components of the system. The processing circuitry 22 may be embodied in a number of different ways and may, for example, include one or more processing devices configured to perform independently. Additionally or alternatively, the processing circuitry 22 may include one or more processors configured in tandem via a bus to enable independent execution of software instructions, pipelining, and/or multithreading. The use of the terms "processor" or "processing circuitry" may be understood to include a single core processor, a multi-core processor, multiple processors of the apparatus 20, remote or "cloud" processors, or any combination thereof.

In an example embodiment, the processing circuitry 22 may include one or more dedicated processor, specially configured field programmable gate array (FPGA), or application specific interface circuit (ASIC) to perform its corresponding functions. The processing circuitry 22 may additionally or alternatively be implemented using a processor executing software stored in a memory (e.g., memory 24). In this fashion, the processing circuitry 22 may therefore be implemented using special-purpose components implemented purely via hardware design or may utilize hardware components of the computing device that execute computer software designed to facilitate performance of the functions of the processing circuitry.

The processing circuitry 22 of an example embodiment may be configured to execute software instructions stored in the memory 24 or otherwise accessible to the processing circuitry. Alternatively or additionally, the processing circuitry 22 may be configured to execute hard-coded functionality. As such, whether configured by hardware or software methods, or by a combination of hardware with software, the processing circuitry 22 may represent an entity (e.g., physically embodied in circuitry) capable of performing operations according to an embodiment of the present disclosure while configured accordingly. Alternatively, as another example, when the processing circuitry 22 is embodied as an executor of software instructions, the software instructions may specifically configure the circuitry to perform the algorithms and/or operations described herein when the software instructions are executed.

Memory 24 is non-transitory and may include, for example, one or more volatile and/or non-volatile memories. In other words, for example, the memory may be an electronic storage device (e.g., a computer readable storage medium). The memory 24 may be configured to store information, data, content, applications, software instructions, or the like, for enabling the computing device 18 to carry out various functions in accordance with example embodiments contemplated herein.

The communications circuitry 26 may be any means such as a device or circuitry embodied in either hardware or a combination of hardware and software that is configured to receive and/or transmit data from/to a network and/or any other device, circuitry, or module, such as the augmented reality display 20, in communication with the computing device 18. In this regard, the communications circuitry 26 may include, for example, a network interface for enabling communications with a wired or wireless communication network. For example, the communications circuitry 26 may include one or more network interface cards, antennas, buses, switches, routers, modems, and supporting hardware and/or software, or any other device suitable for enabling communications via a network. Additionally or alternatively, the communication interface 26 may include the circuitry for causing transmission of such signals to a network or to handle receipt of signals received from a network.

Figure 3:
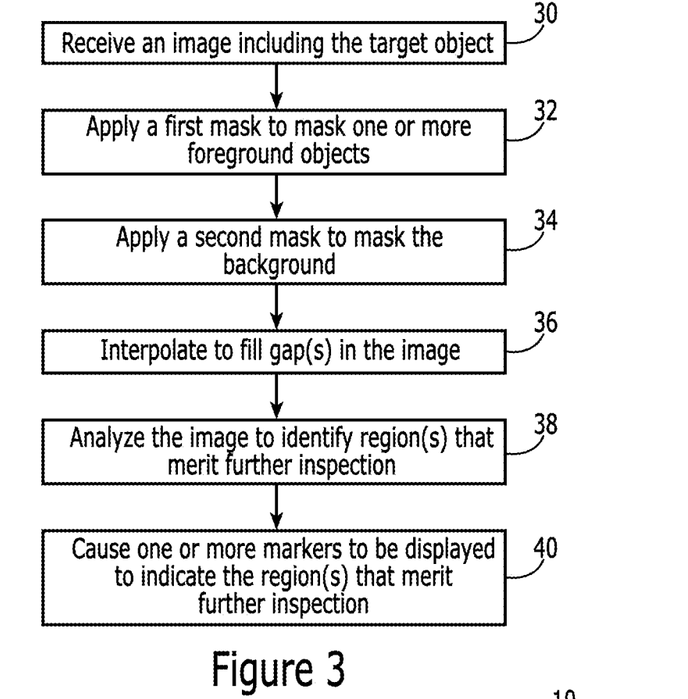
FIG. 3 is a flowchart illustrating operations performed, such as by the system of FIG. 2, in accordance with an example embodiment of the present disclosure.

With reference now to FIG. 3, the operations performed, such as by the system 16 of FIG. 2 in accordance with an example embodiment are depicted. As shown in block 30, the system 16, such as the computing device 18 and, more particularly, the processing circuitry 22, is configured to receive an image including the target object. The image may be a still image or a video comprised of a plurality of sequential images. In either instance, the image may be received from a camera or other image capturing device or the image may have been previously captured and may have been stored such that the processing circuitry 22 receives the image from memory 24 or from another computing device, such as an image server, an image database or the like.

Figure 4A:
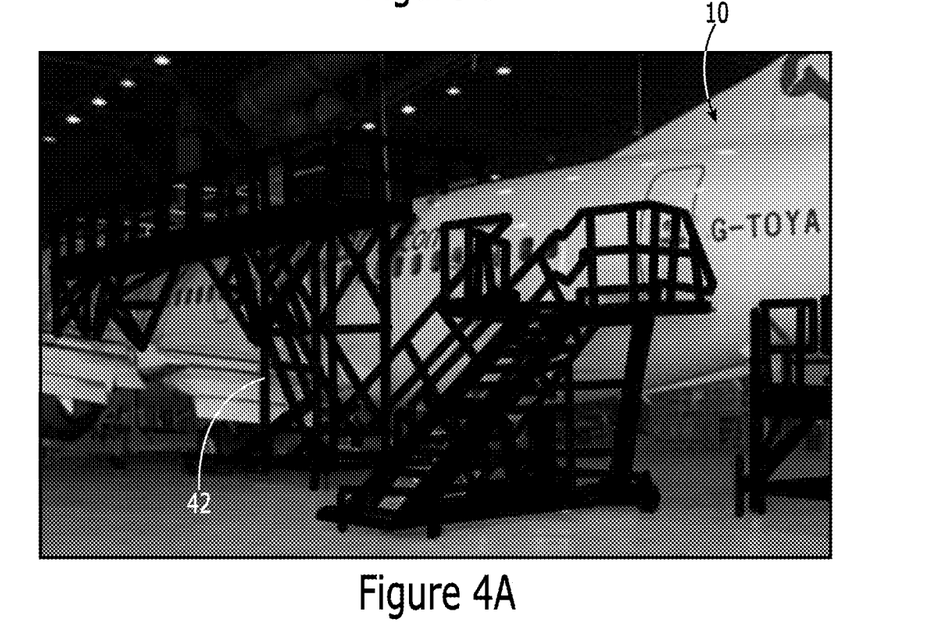
FIGS. 4A, 4B and 4C depict the image of FIG. 1 after application in accordance with an example embodiment of a first mask to a foreground object, a second mask to the background and both the first and second masks, respectively.

The system 16, such as the computing device 18 and, more particularly, the processing circuitry 22 is then configured to apply first and second masks to the image in order to mask and, therefore eliminate one or more foreground objects and the background, respectively, from the image in order to permit the target object to be more clearly analyzed without the obstructions created by one or more foreground objects and the background, thereby increasing the efficiency and the accuracy with which the target object may be analyzed. As shown in block 32 of FIG. 3, the processing circuitry 22 is configured to apply a first mask to at least a portion of the image in order to mask one or more foreground objects that at least partially block the view of the target object. As shown in FIG. 4A, the image of FIG. 1 is again depicted following the application of a first mask 42 in order to mask the foreground object, that is, the scaffolding, that otherwise partially blocks the view of the target object, that is, a portion of the fuselage of an aircraft 10.

Figure 4B:
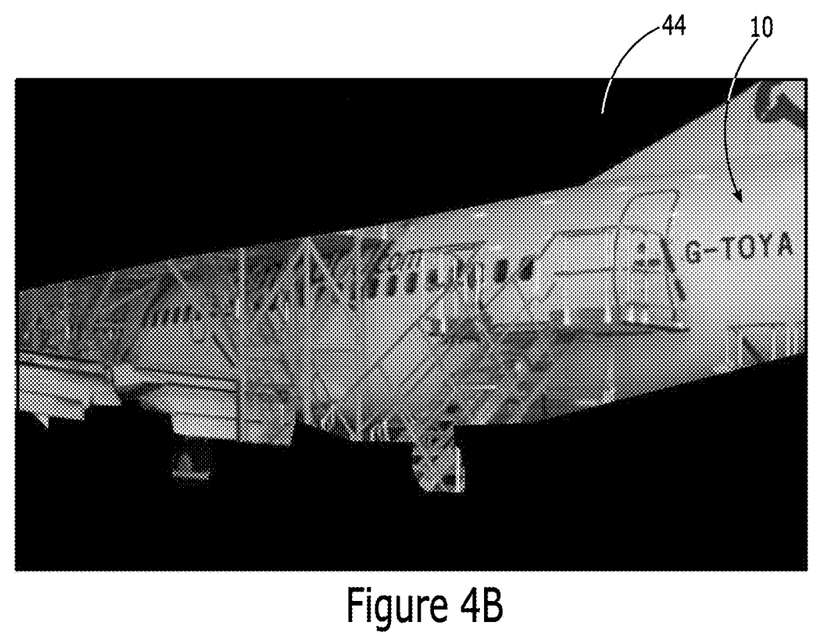
Figure 4C:
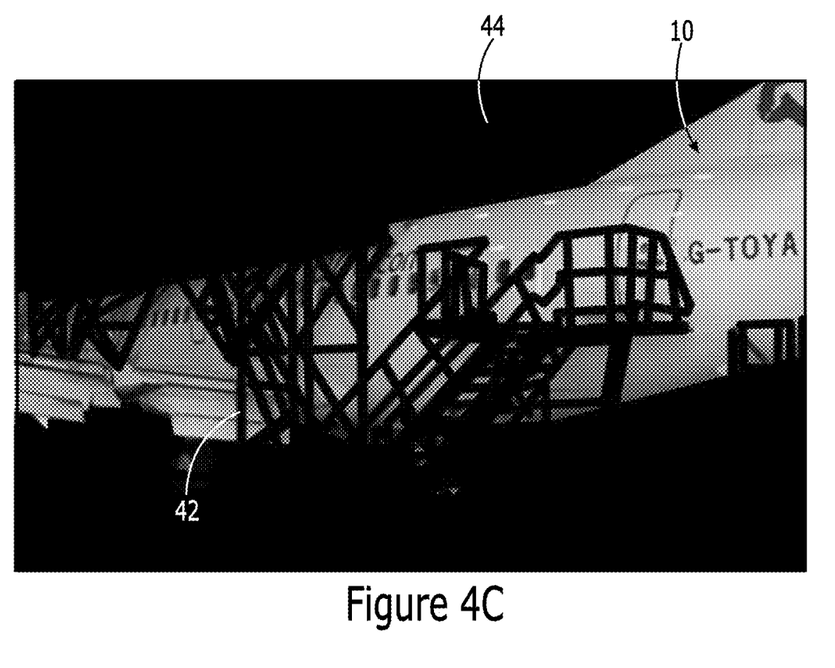

As shown in block 34 of FIG. 3, the processing circuitry 22 is also configured to apply a second mask to at least a portion of the image in order to mask the background of the target object. In this regard, FIG. 4B again depicts the image of FIG. 1 including a portion of the fuselage of an aircraft 10 to which a second mask 44 has been applied in order to mask the background behind and around the target object, that is, a portion of the fuselage of an aircraft 10. Although FIGS. 4A and 4B depict the separate application of first and second masks, respectively, the processing circuitry 22 of an example embodiment is configured to apply both the first mask and the second mask to the image so as to mask both of the one or more foreground objects and the background of the target object. As shown in FIG. 4C, both a first mask 42 to mask the scaffolding that otherwise appears in the foreground and a second mask 44 to mask the background have been applied by the processing circuitry 22 to facilitate focus upon the target object, that is, a portion of the fuselage of an aircraft 10.

The processing circuitry 22 of an example embodiment is also configured to analyze the image of the target object following application of the first and second masks in order to identify one or more regions of the target object that merit further inspection. See block 38 of FIG. 3. The processing circuitry 22 may be configured to perform the image analysis in various manners. In one embodiment, however, the processing circuitry 22 is configured to access a reference image of the target object or of an object that is the same type as the target object. In one embodiment, the reference image depicts the target object or an object of the same type as the target object in the desired condition without anomalies. Alternatively, the reference image may depict the target object or an object of the same type as the target object with one or more predefined anomalies. In this alternative embodiment, the reference image may include labels or tags in association with the predefined anomalies in order to identify the anomalies and, in some embodiments, to provide information regarding the anomalies, such as the type of anomaly, the preferred manner to address the anomaly or the like.

Although the reference image may be stored and accessed in various manners, the processing circuitry 22 of an example embodiment is configured to access the reference image, such as from the memory 24 or from an image server, an image database or other store of reference images in communication with the computing device 18. The processing circuitry 22 of this example embodiment is configured to analyze the image of the target object by comparing the image of the target object following application of the first and second masks to the reference image and to identify one or more regions of the target object that differ from corresponding regions of the target object or the object of the same type as the target object depicted by the reference image. In an example embodiment, the processing circuitry 22 may be configured to identify any differences between corresponding regions of the image of the target object under analysis and the reference image. However, the processing circuitry 22 of other example embodiments is configured to identify those regions of the image of the target object that differ by at least a predefined amount from corresponding regions of the target object or an object of the same type as the target object that is presented by the reference image. The regions of the target object that are identified based upon variations from corresponding regions of the target object or an object of the same type as the target object that is depicted by the reference image may be identified to merit further inspection, such as a more detailed automated inspection and/or a manual inspection in order to confirm or discount the anomaly.

As shown in block 40 of FIG. 3, the system 16 of an example embodiment is configured to cause one or more markers to be displayed in order to indicate the one or more regions of the target object that have been identified to merit further inspection. For example, the computing device 18, such as the processing circuitry 22, the communication circuitry 26 or the like, may be configured to provide an indication to the augmented reality display 20 as to the one or more regions of the target object that have been identified to merit further inspection. The indication may identify the location upon the target object of each region that may merit further inspection and, in some embodiments, may provide information regarding the potential anomaly, such as the type of anomaly. The location upon the target object of each region that may merit further inspection may be provided in various manners including the provision of the image of the target object with the regions that merit further inspection being identified by a marker and/or based upon coordinates defining the location of the regions that merit further inspection relative to the position of the target object within the image.

In this example embodiment, the augmented reality display 20 may permit the target object to be viewed by a user, such as an inspector, maintenance personnel or the like, through the augmented reality display. Alternatively, the augmented reality display 20 may include or be in communication with a camera or other image capturing device that captures an image of the target object that is then presented upon the augmented reality display. The augmented reality display 20 is also configured to cause one or more markers to be displayed in order to indicate the one or more regions of the target object that have been identified to merit further inspection. The markers may be provided in various manners. For example, the markers may be positional indicators, such as pointers, tags or the like, that flag the locations of the potential anomalies that have been identified with respect to the target object. Additionally or alternatively, the markers may include or be associated with information presented by the augmented reality display 20 regarding the anomalies, such as information identifying why the anomaly was identified, the potential type of the anomaly, remedial action that could be taken to address the anomaly or the like. In order to identify the location of the potential anomalies relative to the target object viewed by the user through the augmented reality display 20 (or the image of the target object presented upon the augmented reality display), the target object that is included in the image may be located relative to the target object viewed by the user via the augmented reality display. For example, the target object that is included in the image may be located relative to the target object viewed via the augmented reality display 20 by identifying a reference or anchor point or by utilizing object recognition in order to identify a reference feature or object in each of the image and the scene viewed by the user via the augmented reality display 20, such as the upper left hand corner of a door, and then defining a location within the image of the target object and a corresponding location within the scene viewed by the user via the augmented reality display based upon the common position of the reference or anchor point or the reference feature or object in each of the image of the target object and the scene viewed by the user via the augmented reality display. By locating the target object that is included in the image relative to the target object viewed by the user via the augmented reality display 20, the markers may be presented by the augmented reality display in alignment with regions of the target object that have been identified from an analysis of the image to merit further inspection.

Figure 5:
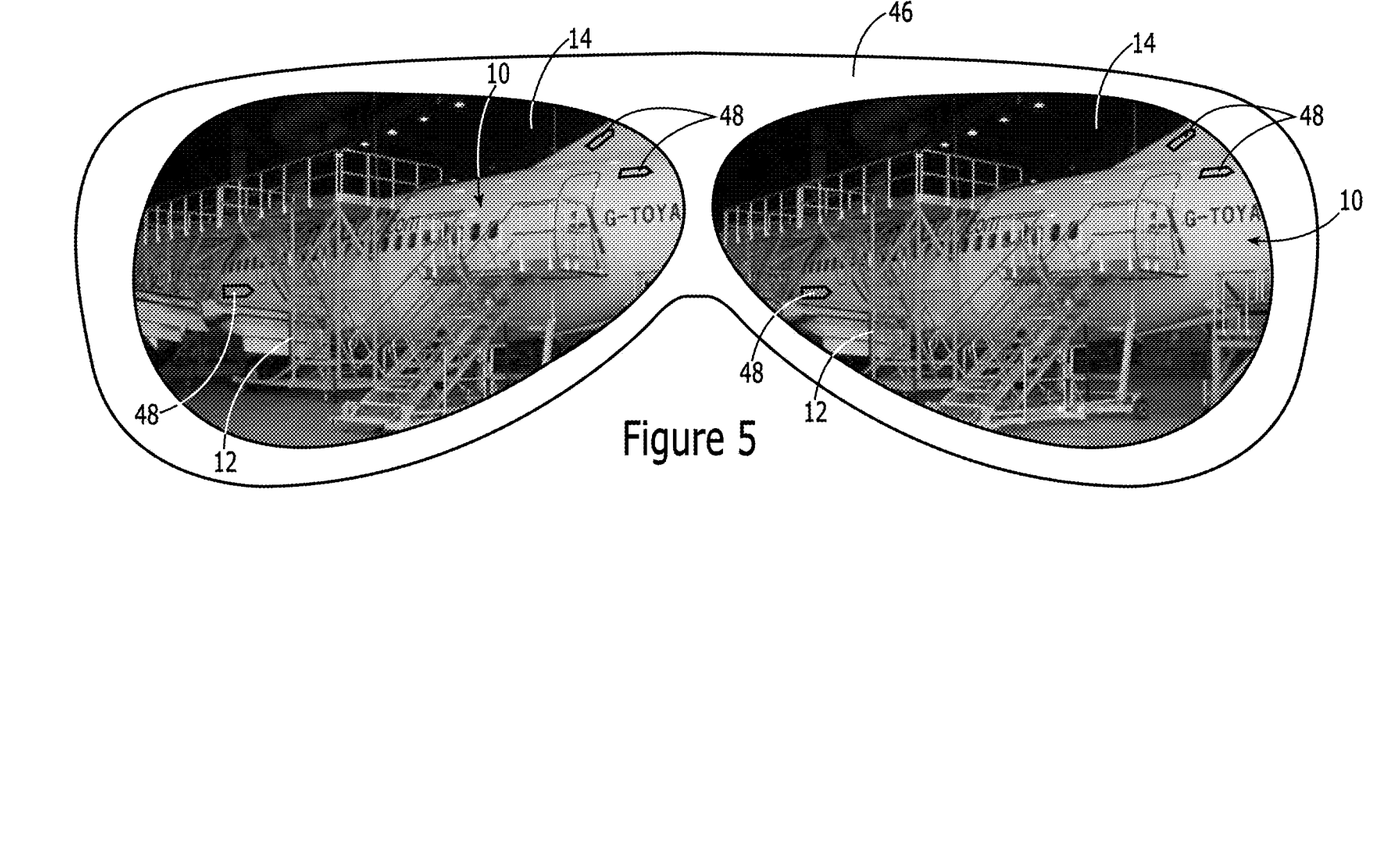
FIG. 5 is a perspective view of augmented reality glasses configured to present information regarding the one or more regions of the target object that merit further inspection in accordance with an example embodiment.

Although the augmented reality display 20 may be configured in various manners including a variety of head-worn display devices, such as a helmet having an augmented reality display or visor, FIG. 5 depicts an embodiment to which the augmented reality display 20 is embodied by augmented reality glasses 46. In this example, the augmented reality glasses 46 permit the person wearing the glasses to view a scene, such as a portion of the target object, through the augmented reality glasses, while also presenting markers 48 identifying the regions of the target object that have been identified to merit further inspection. For example, the user donning the augmented reality glasses 46 may be standing on the floor of the manufacturing facility and may view the same portion of the fuselage of the aircraft 10 that is the subject of the image that has been analyzed by the computing device 18, such as the processing circuitry 22. As a result of the identification of one or more regions that merit further inspection, the augmented reality glasses 46 may cause markers 48 to be presented upon the display with the markers co-located with the regions of the target object viewed by the user through the augmented reality glasses that merit further inspection, as shown in FIG. 5.

The masking of the one or more foreground objects may remove the foreground objects but may create gaps in the resulting image of the target object where the one or more foreground objects previously blocked the view of the target object. See, for example, FIG. 4A which illustrates gap created by application of the first mask 42 to the foreground object in the form of scaffolding. In order to prevent or at least reduce the instances in which the portion of the image to which the first mask 42 has been applied is identified as a potential anomaly that merits further inspection as a result of differences identified from a comparison to the reference image that did not include the foreground objects and, as a result, did not include corresponding gaps in the image attributable to the masking of the foreground objects, the processing circuitry 22 of an example embodiment is also configured to interpolate between the pixels on one or both sides of the gap so as to fill one or more portions of the target object, that is, to fill the gap, to which the view was at least partially blocked by the one or more foreground objects. See block 36 of FIG. 3. The processing circuitry 22 may be configured to perform the interpolation in various manners including linear interpolation, bilinear interpolation, quadratic interpolation or motion vector-based interpolation. Regardless of the type of interpolation, the processing circuitry 22 of an example embodiment is configured to fill those portions of the target object that are otherwise masked by the first mask 42 with pixels having values approximated based upon the values of the pixels in the vicinity of, such as on either side or both sides of the first mask.

Although the processing circuitry 22 may be configured to interpolate across any portion of the target object that is masked by the first mask 42, the processing circuitry of an example embodiment is configured to interpolate across only those portions of the target object that are masked by the first mask 42 that have a size, such as a width, that satisfies a predefined criteria, such as by being less than a predefined threshold. In this example embodiment, those portions of the target object that are masked by a first mask 42 having a smaller dimension, such as a smaller width, may be filled by the interpolation process, but larger portions of the target object that are masked by portions of the first mask having larger dimensions, such as a larger width, are not filled by interpolation. Since smaller gaps may be more accurately filled by interpolation than larger gaps, the processing circuitry 22 may be configured to condition the interpolation upon the size of the portion of the target object that is masked such that interpolation is performed in a manner that retains the accuracy of the resulting image of the target object and does not risk the introduction of greater errors associated with the interpolation across larger portions of the target object that are masked by portions of the first mask 42 having larger dimensions.

The application of the first mask 42 may include the generation of the first mask. The first mask may be generated in various manners. In an example embodiment, one or more models of predefined types of foreground objects may be defined and may be stored, for example, in memory 24 or in a database accessible to the computing device 18, such as via the communication circuitry 26. The one or more models may be models of foreground objects that are most commonly located or is otherwise anticipated to be located in the foreground of a target object of the type of target object that is the subject of the image. As shown in block 50 of FIG. 6, the computing device 18, such as the processing circuitry 22, of this example embodiment is configured to access one or more models of predefined types of foreground objects, such as by accessing the memory 24, a database or other store of models of predefined types of foreground objects. The processing circuitry 22 of this example embodiment is also configured to fit the one or more models to one or more foreground objects in the image. See block 52. In this regard, the processing circuitry 22 is configured to adjustably position different ones of the models relative to the image in order to determine whether the model aligns with or is out of alignment with a foreground object in the image. In conjunction with fitting one or more models to one or more foreground objects in an image, the processing circuitry 22 of an example embodiment may be configured to re-size the model, such as by enlarging or reducing the model in size, in order to determine whether the model aligns with a foreground object.

In an instance in which a model aligns with a foreground object in the image, such as by being of the same size and shape as the foreground object, the processing circuitry 22 is configured to define the first mask 42 based upon the model of the predefined type of foreground object that fits the foreground object in the image. See block 54 of FIG. 6. As described above, the first mask may then be placed upon the image in alignment with the foreground object to mask the foreground object from the image. In this regard, the first mask may be defined by the processing circuitry 22 to have the same size and shape and to be positioned at the same location relative to the image of the target object as the model that is determined to fit the foreground object, by being aligned with the foreground object.

In another example embodiment, the computing device 18, such as the processing circuitry 22, is configured to apply the first mask 42 to at least a portion of the image so as to mask a foreground object by causing a scene including the target object to be scanned, such as with an three dimensional scanner, e.g., an infrared scanner, to generate three dimensional surfaces of the one or more foreground objects. See block 60 of FIG. 7. In this regard, the scene may be scanned utilizing various photogrammetry techniques including three dimensional (3D) scanning systems or spatial mapping systems. As a more particular example, 3D measurement systems or 3D metrology systems, such as a 3D scanning system, a 3D mapping system or a holographic mapping system, may be utilized to create a 3D mesh representative of the scene that has been scanned. Alternatively, the scene may be scanned utilizing spatial photogrammy. Spatial photogrammy is configured to identify the different objects within the scene, such as based upon the different positions or locations of the objects as well as the different materials, textures, colors or other characteristics of the object. The computing device 18, such as the processing circuitry 22, of this example embodiment, is configured to fit the three dimensional surfaces generated by the scan of the scene to one or more foreground objects in the image. See block 62. In this regard, the three dimensional surfaces of the one or more foreground objects determined as a result of scanning the scene, such as by any of the various photogrammetry techniques or by spatial photogrammy, are positioned relative to the one or more foreground objects in the image to determine if a respective three dimensional surface is the same size and shape as a foreground object. In an instance in which the respective three dimensional surface has the same size and shape as the foreground object, the three dimensional surface is considered to be fit to and aligned with the foreground object and the processing circuitry 22 is configured in this instance to define the first mask that masks the foreground object from the image to be based upon the three dimensional surface that fits with the foreground object. See block 64. In this regard, the first mask may have the same size, shape and location as the three dimensional surface fit to the foreground object.

The application of the second mask 44 may also include the generation of the second mask. The second mask 44 may be generated in a comparable manner to the first mask 42. For example, the computing device 18, such as the processing circuitry 22, of an example embodiment may be configured to access one or more models of candidate target objects, such as by accessing the memory 24, a database or other store of models of candidate target objects. See block 50 of FIG. 6. The models of the candidate target object may be developed and stored based upon the types of target objects that are to be the subject of the automated inspection process. In an example in which aircraft 10 are to be inspected, the models of the candidate target objects may include models of a variety of different types of aircraft.

Figure 6:
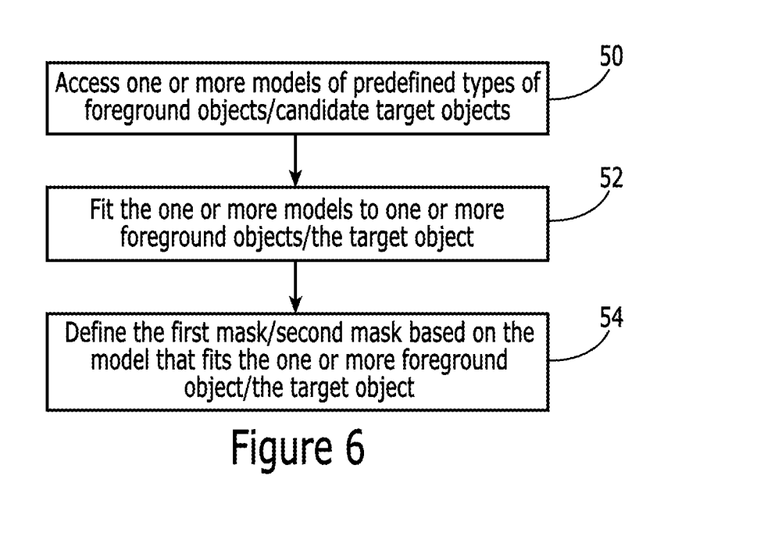
FIG. 6 is a flowchart illustrating operations performed, such as by the system of FIG. 2 in order to generate a first mask in accordance with an example embodiment of the present disclosure.

In this example embodiment and as shown in block 52 of FIG. 6, the computing device 18, such as the processing circuitry 22, is configured to fit the one or more models to the target object in the image, such as by overlaying the model upon the corresponding target object in order to determine whether the model is sized and shaped to closely approximate the target object in the image. As described above with respect to the models of the foreground objects, the processing circuitry 22 may be configured to re-position and re-size the model of the target object in order to determine whether a model fits to the target object by overlying the target object and having the same size and shape as the target object. In an instance in which a model has been fit to the target object, the computing device 18, such as the processing circuitry 22, is then configured to define the second mask 44 to overlie all portions of the image other than the portion of the image to which the model has been fitted. See block 54. Thus, the second mask 44 masks the background, but does not mask any portion of the target object, which is protected by the model that has been fit to the target object in the image of this example embodiment.

In conjunction with the application of the second mask 44 in accordance with another example embodiment, the second mask may be generated by the computing device 18, such as the processing circuitry 22, by scanning the scene including the target object that is the subject of the image to generate a three dimensional surface of the target object. See block 60 of FIG. 6. As described above, the scene may be scanned by, for example, various photogrammetry techniques including those noted above or by spatial photogrammy, which recognizes the target object relative to other objects, such as foreground objects or the background, based upon the location, size and shape of the target object, and/or based on the material forming the target object, the color or texture of the target object or other characteristics of the target object. The computing device 18, such as the processing circuitry 22, of this example embodiment is then configured to fit the three dimensional surface to the target object in the image. See block 62 of FIG. 7. In this regard, a respective three dimensional surface determined as a result of scanning the scene, such as by any of the various photogrammetry techniques or by spatial photogrammy, is positioned relative to the target object in the image to determine if the respective three dimensional surface is the same size and shape as the target object. In an instance in which the respective three dimensional surface has the same size and shape as the target object, the three dimensional surface is considered to be fit to and aligned with the target object and the processing circuitry 22 is configured to define the second mask 44 that masks the background from the image based upon the upon the three dimensional surface that fits the target object so as to cover the entirety of the image other than the target object as defined by the model that has been fit to the target object.

Figure 8A:
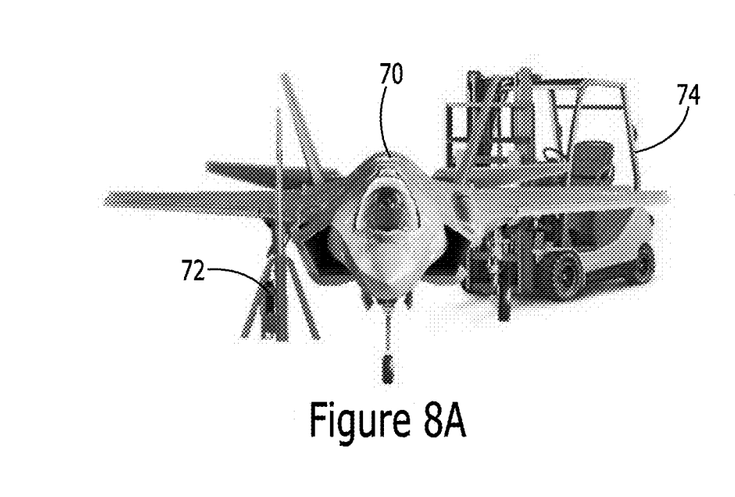
FIGS. 8A-8D illustrate the identification of a foreground object and the background and the application of first and second masks to provide for enhanced focus upon the target object in accordance with an example embodiment of the present disclosure.
Figures 8B, 8D:
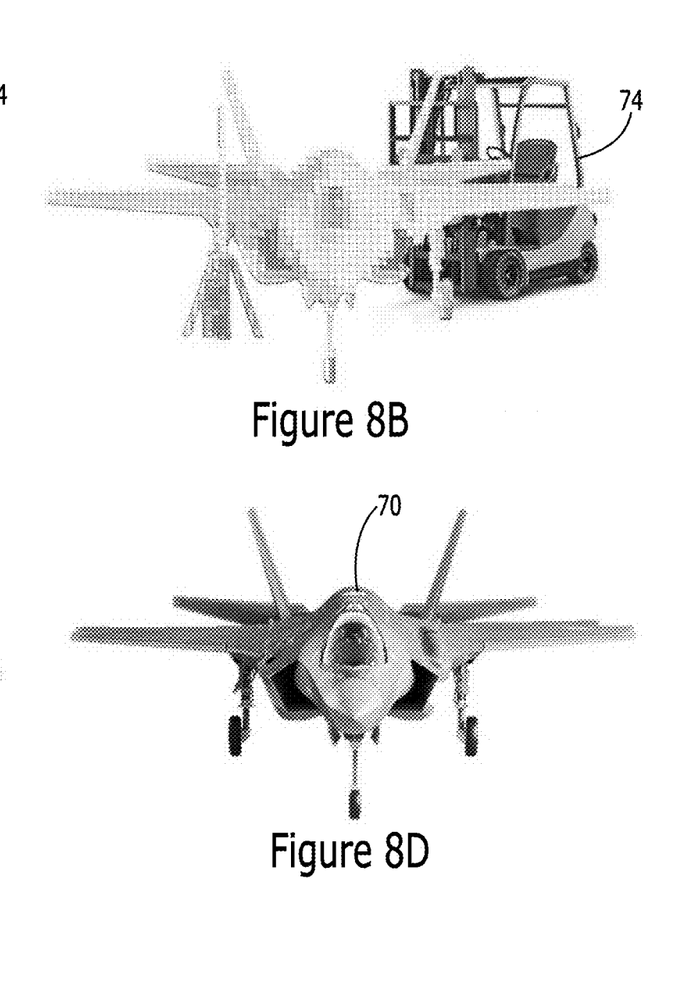
Figure 8C:
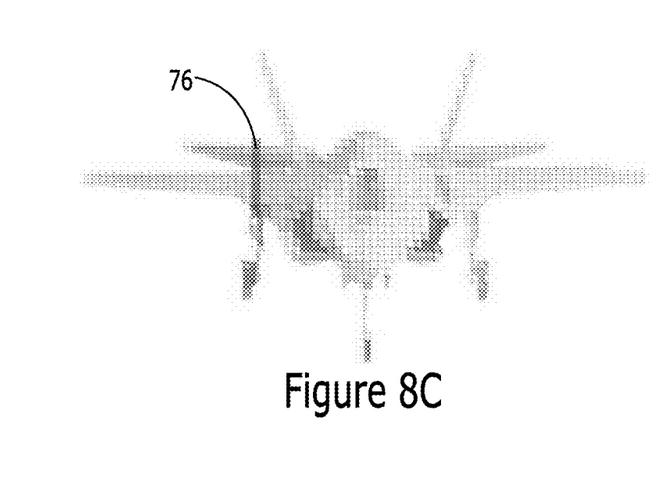

By way of example, FIG. 8A depicts an aircraft 70 having a stand 72 sitting in front of a portion of the aircraft and serving as foreground object, and a forklift 74 sitting behind a portion of the aircraft and serving as the background. In this example embodiment and in conjunction with the application of a first mask 42, a model may be fit to the stand 72 in an instance in which models of predefined types of foreground objects are referenced by the computing device 18, such as the processing circuitry 22, or a three dimensional surface may be fit to the stand in an embodiment in which the scene is scanned to generate three dimensional surfaces of the foreground objects, such as by use of any of the various photogrammetry techniques or by use of spatial photogrammy. In addition to identifying the stand 72 by use of a model or a three dimensional scan, the application of the second mask 44 may also initially identify the target object, such as the aircraft 70. In this regard, the target object may identified, such as either by reference to a model of the aircraft 70, or by scanning the scene so as to identify the target object, such as the aircraft. Once the foreground object and the target object have been identified as shown in FIG. 8B, the first mask 42 and the second mask 44 may be generated with the first mask having the same size and shape as the model or the three dimensional surface that has been fit to the stand 72 and the second mask covering the entire image other than that portion of the image that includes the target object as defined by the model or the three dimensional surface that has been fit to the aircraft 70. The first and second masks 42, 44 are then applied so as to mask the foreground object, that is, the stand 72, and the background, that is, the forklift 74, as shown in FIG. 8C. The portion 76 of the aircraft 70 that was previously blocked by the foreground object, that is, the stand 72, may then be filled by interpolation such that the pixel values of that portion of the aircraft that was previously blocked by the stand are assigned based upon pixel values on either or both sides of that portion of the target object that was previously blocked by the stand. After having masked the stand 72 in the foreground and the forklift 74 in the background and following interpolation to fill that portion of the target object as previously blocked by the stand, an image that focuses upon the target object is presented as shown in FIG. 8D.

Based upon the resulting image of the target object after having removed the one or more foreground objects and the background, such as shown in FIG. 8D, the computing device 18, such as the processing circuitry 22, is configured to analyze the image of the target object so as to identify any anomalies, such as by comparing the image of the target object to one or more reference images of the same type of target object that are either free of anomalies or that include predefined types of anomalies. As a result, the computing device 18, such as the processing circuitry 22, may efficiently and reliably identify regions of the target object that merit further inspection, such as regions of the target object that may include anomalies. In an example embodiment, information, such as markers, associated with the potential anomalies may be provided to an augmented reality display 20, such as augmented reality glasses 46, through which a user, such as an inspector, a maintenance worker or the like, views the target object and upon which the information provided the computing device 18, such as the processing circuitry 22, regarding the anomalies is presented. For example, markers may be presented by the augmented reality display 20 in alignment with those regions of the target object that have been identified as meriting further inspection so as to flag the relevant locations upon the target object that merit further inspection. As noted above, additional information may also be provided by the augmented reality display 20 with the additional information regarding the potential anomaly, such as the type of potential anomaly, a technique for curing the anomaly or the like. As such, the resulting inspection may be conducted in both an efficient and accurate manner regardless of the presence of foreground object(s) and the background behind the target object.

Figure 7:
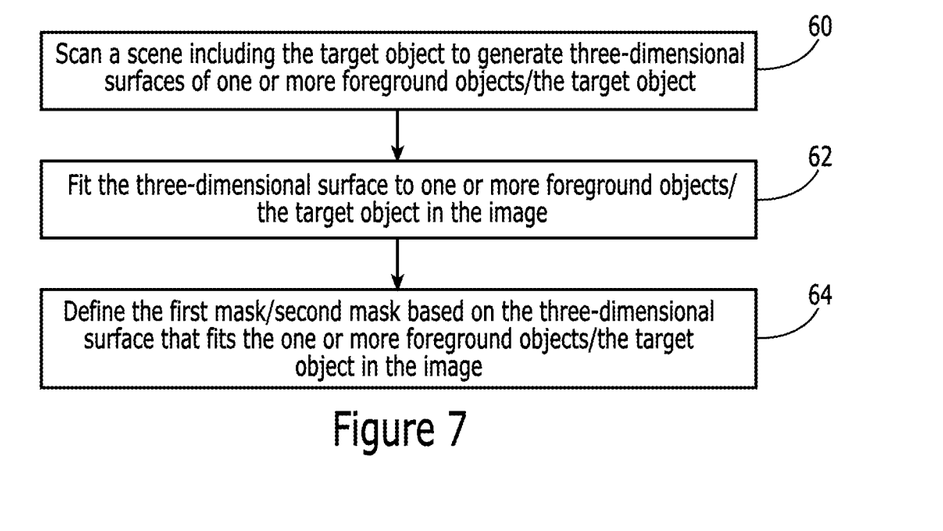
FIG. 7 is a flowchart illustrating operations performed, such as by the system of FIG. 2 in order to generate a second mask in accordance with an example embodiment of the present disclosure.

FIGS. 3, 6 and 7 illustrate flowcharts describing the operation of apparatuses, methods, and computer program products according to example embodiments of the invention. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory 24 of a computing device 18 employing an embodiment of the present invention and executed by processing circuitry 22 of the computing device. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purpose of limitation.

What is claimed is:

1. A method for facilitating inspection of a target object, the method comprising:
    receiving an image including the target object;
    applying a first mask to at least a portion of the image in order to mask one or more foreground objects that at least partially block view of the target object;
    interpolating across one or more portions of the target object that are masked by the first mask in order to fill the one or more portions of the target object to which the view is at least partially blocked by the one or more foreground objects, wherein the interpolating is conditioned upon a size of the portion of the target object that is masked by the first mask such that the one or more portions that have a size that is smaller than a predefined threshold are filled but the one or more portions that have a size larger than the predefined threshold are not filled;
    applying a second mask to at least a portion of the image in order to mask a background of the target object;
    generating a resultant image of the target object with the one or more foreground objects removed and the background of the target object removed; and
    analyzing the resultant image of the target object to identify one or more regions of the target object that merit further inspection, wherein analyzing the resultant image comprises comparing the resultant image to at least one reference image of an object of a same type as the target object having at least one predefined type of anomaly, wherein analyzing the resultant image of the target object to identify one or more regions of the target object that merit further inspection comprises analyzing the resultant image to identify an anomaly as a region of the target object that merits further inspection based on the at least one predefined type of anomaly from the at least one reference image.

2. The method of claim 1 wherein applying the first mask comprises:
    accessing one or more models of predefined types of foreground objects;
    fitting the one or more models to one or more foreground objects in the image; and
    defining the first mask based upon a respective model fit to a respective foreground object.

3. The method of claim 1 wherein applying the first mask comprises:
    scanning a scene including the target object that is a subject of the image to generate three dimensional surfaces of the one or more foreground objects;
    fitting the three dimensional surfaces to one or more foreground objects in the image; and
    defining the first mask based upon a respective three dimensional surface fit to a respective foreground object.

4. The method of claim 1 wherein applying the second mask comprises:
    accessing one or more models of candidate target objects;
    fitting the one or more models to the target object in the image; and
    defining the second mask based upon a respective model fit to the target object.

5. The method of claim 1 wherein applying the second mask comprises:
    scanning a scene including the target object that is a subject of the image to generate a three dimensional surface of the target object;
    fitting the three dimensional surface to the target object in the image; and
    defining the second mask based upon a respective three dimensional surface fit to the target object.

6. The method of claim 1 further comprising causing one or more markers to be displayed in order to indicate the one or more regions of the target object that have been identified to merit further inspection.

7. The method of claim 2 wherein fitting the one or more models to one or more foreground objects in the image comprises adjustably positioning the one or more models and re-sizing the one or more models to determine whether the one or more models aligns with the one or more foreground objects.

8. An apparatus configured to facilitate inspection of a target object, the apparatus comprising a computing device configured to:
    receive an image including the target object;
    apply a first mask to at least a portion of the image in order to mask one or more foreground objects that at least partially block view of the target object;
    interpolate across one or more portions of the target object that are masked by the first mask in order to fill the one or more portions of the target object to which the view is at least partially blocked by the one or more foreground objects, wherein the interpolating is conditioned upon a size of the portion of the target object that is masked by the first mask such that the one or more portions that have a size that is smaller than a predefined threshold are filled but the one or more portions that have a size larger than the predefined threshold are not filled;

apply a second mask to at least a portion of the image in order to mask a background of the target object;

generate a resultant image of the target object with the one or more foreground objects removed and the background of the target object removed; and analyze the resultant image of the target object to identify one or more regions of the target object that merit further inspection, wherein analyzing the resultant image comprises comparing the resultant image to at least one reference image of an object of a same type as the target object having at least one predefined type of anomaly, wherein the computing device configured to analyze the resultant image of the target object to identify one or more regions of the target object that merit further inspection is configured to analyze the resultant image to identify an anomaly as a region of the target object that merits further inspection based on the at least one predefined type of anomaly from the at least one reference image.

9. The apparatus of claim 8 wherein the computing device is configured to apply the first mask by:
accessing one or more models of predefined types of foreground objects;
fitting the one or more models to one or more foreground objects in the image; and
defining the first mask based upon a respective model fit to a respective foreground object.

10. The apparatus of claim 8 wherein the computing device is configured to apply the first mask by:
scanning a scene including the target object that is a subject of the image to generate three dimensional surfaces of the one or more foreground objects;
fitting the three dimensional surfaces to one or more foreground objects in the image; and
defining the first mask based upon a respective three dimensional surface fit to a respective foreground object.

11. The apparatus of claim 8 wherein the computing device is configured to apply the second mask by:
accessing one or more models of candidate target objects;
fitting the one or more models to the target object in the image; and
defining the second mask based upon a respective model fit to the target object.

12. The apparatus of claim 8 wherein the computing device is configured to apply the second mask by:
scanning a scene including the target object that is a subject of the image to generate a three dimensional surface of the target object;
fitting the three dimensional surface to the target object in the image; and
defining the second mask based upon a respective three dimensional surface fit to the target object.

13. The apparatus of claim 8 wherein the computing device is further configured to cause one or more markers to be displayed in order to indicate the one or more regions of the target object that have been identified to merit further inspection.

14. The apparatus of claim 9 wherein the computing device is configured to fit the one or more models to one or more foreground objects in the image by adjustably positioning the one or more models and re-sizing the one or more models to determine whether the one or more models aligns with the one or more foreground objects.

15. A system for inspecting a target object, the system comprising:
a computing device configured to:
apply a first mask to at least a portion of an image including the target object in order to mask one or more foreground objects that at least partially block view of the target object;
interpolate across one or more portions of the target object that are masked by the first mask in order to fill the one or more portions of the target object to which the view is at least partially blocked by the one or more foreground objects, wherein the interpolating is conditioned upon a size of the portion of the target object that is masked by the first mask such that the one or more portions that have a size that is smaller than a predefined threshold are filled but the one or more portions that have a size larger than the predefined threshold are not filled;
apply a second mask to at least a portion of the image in order to mask a background of the target object;
generate a resultant image of the target object with the one or more foreground objects removed and the background of the target object removed; and
analyze the resultant image of the target to identify one or more regions of the target object that merit further inspection, wherein analyzing the resultant image comprises comparing the resultant image to at least one reference image of an object of a same type as the target object having at least one predefined type of anomaly, wherein the analyzing the resultant image of the target object to identify one or more regions of the target object that merit further inspection comprises analyzing the resultant image to identify an anomaly as a region of the target object that merits further inspection based on the at least one predefined type of anomaly from the at least one reference image; and
an augmented reality display configured to display an image of the target object and to also display information regarding the one or more regions of the target object that merit further inspection.

16. The system of claim 15 wherein the augmented reality display comprises a head-worn augmented reality display device.

17. The system of claim 15 wherein the information regarding the one or more regions comprises one or more markers displayed by the augmented reality display in order to indicate the one or more regions of the target object that have been identified to merit further inspection.

18. The system of claim 15 wherein the computing device is further configured to apply the first mask by:
accessing one or more models of predefined types of foreground objects;
fitting the one or more models to one or more foreground objects in the image; and
defining the first mask based upon a respective model fit to a respective foreground object.

19. The system of claim 16 wherein the head-worn augmented reality display device comprises augmented reality glasses.

20. The system of claim 18 wherein the computing device is configured to fit the one or more models to one or more foreground objects in the image by adjustably positioning the one or more models and re-sizing the one or more models to determine whether the one or more models aligns with the one or more foreground objects.

\* \* \* \* \*